United States Patent
Ina et al.

(10) Patent No.: US 6,950,179 B2
(45) Date of Patent: Sep. 27, 2005

(54) SHAPE MEASURING APPARATUS, SHAPE MEASURING METHOD, AND ALIGNING METHOD

(75) Inventors: Hideki Ina, Kanagawa (JP); Koichi Sentoku, Tochigi (JP); Takahiro Matsumoto, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 381 days.

(21) Appl. No.: 10/156,921

(22) Filed: May 30, 2002

(65) Prior Publication Data

US 2002/0180983 A1 Dec. 5, 2002

(30) Foreign Application Priority Data

May 30, 2001 (JP) ........................................ 2001/162587

(51) Int. Cl.$^7$ .................. G01N 21/00; G01N 23/00; G01B 11/24
(52) U.S. Cl. .................... 356/73; 356/601; 250/309
(58) Field of Search ................. 356/601–613, 356/73; 250/309–310; 73/105

(56) References Cited

U.S. PATENT DOCUMENTS

| | | | |
|---|---|---|---|
| 4,645,924 A | 2/1987 | Suzuki et al. | 250/236 |
| 4,834,540 A | 5/1989 | Totsuka et al. | 356/401 |
| 4,910,561 A * | 3/1990 | Tsujiuchi et al. | 356/458 |
| 5,133,603 A | 7/1992 | Suzuki et al. | 356/400 |
| 5,508,527 A | 4/1996 | Kuroda et al. | 250/491.1 |
| 5,650,614 A * | 7/1997 | Yasutake et al. | 250/306 |
| 5,939,719 A * | 8/1999 | Park et al. | 250/306 |
| 5,955,661 A * | 9/1999 | Samsavar et al. | 73/105 |
| 6,239,426 B1 * | 5/2001 | Muramatsu et al. | 356/623 |
| 6,341,007 B1 * | 1/2002 | Nishi et al. | 355/53 |
| 6,385,497 B1 | 5/2002 | Ogushi et al. | 700/110 |
| 6,636,311 B1 | 10/2003 | Ina et al. | 356/401 |
| 6,690,473 B1 * | 2/2004 | Stanke et al. | 356/601 |

FOREIGN PATENT DOCUMENTS

| EP | 1 006 413 | 6/2000 |
|---|---|---|
| JP | 2735632 | 1/1998 |
| JP | 2000-228356 | 8/2000 |

* cited by examiner

*Primary Examiner*—Zandra V. Smith
(74) *Attorney, Agent, or Firm*—Fitzpatrick, Cella, Harper, & Scinto

(57) ABSTRACT

A shape measuring method for measuring a shape of a surface of an object. The method includes a first measuring step for measuring the surface of the object by detecting light from the object, and a second measuring step for measuring the surface of the object by relatively scanning a probe and the object. A scanning speed changes on the basis of the result of the first measurement step.

10 Claims, 18 Drawing Sheets

SEMICONDUCTOR DEVICE MANUFACTURING FLOW

SHAPE MEASURING APPARATUS, SHAPE MEASURING METHOD, AND ALIGNING METHOD

FIELD OF THE INVENTION

The present invention relates to a stereoscopic shape measuring apparatus called a profiler and a stereoscopic shape measuring method. More particularly, the present invention relates to an atomic force microscope (AFM) employed to control a process of chemical mechanical polishing (CMP) in semiconductor manufacturing. Furthermore, the present invention relates to an offset analyzer in which the aforementioned stereoscopic shape measuring system is applied to offset direction, such as alignment mark detection, or the like.

BACKGROUND OF THE INVENTION

As an integrated circuit becomes highly integrated and highly dense, it is required for a projection aligner (an exposure apparatus) employed in semiconductor manufacturing to project and expose a circuit pattern of a reticle surface onto a wafer surface at higher resolution. Since a projection resolution of a circuit pattern depends upon the numerical aperture (NA) of a projection optical system and an exposure wavelength (λ), a method wherein the NA of a projection optical system is increased while having a fixed exposure wavelength, has been applied to manufacturing products. As an example of employing 248 nm, that is, a KrF excimer laser oscillation wavelength, an aligner having an NA of 0.6 or more has already been introduced commercially.

As the NA increases, an optical depth decreases, becoming inversely proportional to $NA^2$. To solve this problem, a CMP process, that is, a planarizing technique, is introduced.

FIG. 1 shows the processing steps of metal CMP as an example of the CMP process, and a structure of a planarized wafer. According to the metal CMP shown in FIG. 1, etching is performed on $SiO_2$ of the surface of a wafer (first step); then Tungsten is deposited on the surface of the wafer (second step); unnecessary Tungsten is removed by CMP processing (third step); Al/Si/Cu is deposited thereupon (fourth step); and TiN is deposited (fifth step).

In a planarization process of CMP, particularly, in the metal CMP shown in FIG. 1, it is difficult to maintain the most appropriate condition due to an apparatus factor error. Therefore, it is necessary to control parameters of a CMP apparatus so as to keep a uniform shape of a pattern of the wafer by frequently measuring the shape of the pattern after CMP.

For instance, such error causes deterioration of the alignment accuracy in a semiconductor aligner. More specifically, a structure of alignment marks becomes asymmetrical due to the CMP processing. As a result, a rotating error shown in FIG. 2 or a magnification error shown in FIG. 3 is generated in global alignment, causing deteriorated accuracy.

FIG. 4 shows data obtained by actually measuring alignment marks with an AFM. The data is obtained from resist-coated alignment marks. The alignment mark has a structure called metal CMP shown in FIG. 1. The right and left shots (patterns A and C) and the middle shot (pattern B) of wafer W are compared with respect to the resist shapes of the alignment marks. As can be shown in FIG. 4, the shape on the surface of the middle shot is symmetrical, but each shape on the surfaces of the right and left shots is asymmetrical. The patterns A and C have a reversed symmetry. If global alignment is performed with the reversed asymmetry as mentioned above, a rotating error shown in FIG. 2 is caused.

For this reason, in order to maintain high accuracy of alignment, it is necessary to control the CMP process by measuring the alignment marks after the CMP process with a profiler, such as an AFM, or the like, to make sure that the resist shapes are symmetrical. Besides the aforementioned symmetry of the pattern, it is also necessary to control characteristics such as planarity, over/under etching, dicing, and oxide erosion.

The stereoscopic shape measuring means (profiler) employed in the process control of the CMP can be categorized into optical means and non-optical means. For non-optical means, an AFM and a stylus profiler, and for optical means, a profiler employing an interferometer, are described below by citing specific examples.

An example of an AFM is a Dimension Metrology AFM, manufactured by Digital Instrument, which is aimed to measure critical dimensions (CD), e.g., a line width, pitch and depth, wall angle, roughness, and so on. A structure of this apparatus is shown in FIG. 5. Detection in the vertical direction of this drawing is realized by having the end (radius 5–20 nm) of a probe 9 approach to the surface of a measurement target 1 up to a point that an atomic force is generated, and detecting this position of the probe 9 with an optical sensor 10 (vertical resolution of 0.8 nm). Detection in the horizontal direction is realized by driving the probe (horizontal resolution of 1 nm) in the range of up to 70 μm with a piezoelectric device. Accordingly, stereoscopic measurement of the measurement target 1 is realized.

An effective measurement mode is neither a contact nor a non-contact mode, but a tapping mode, which realizes measurement by oscillating the probe 9 with a resonant frequency of 200 to 400 Khz.

An example of a stylus profiler is an HRP240ETCH (HRP: High Resolution Profiler), manufactured by KLA-Tencor, which is capable of measuring the entire area of a 300 mm wafer. A structure of this apparatus is shown in FIG. 6. Detection in the vertical direction of this drawing is realized by tracing the surface of the measurement target 1 with the end (radius 20–40 nm) of a stylus 13, which has the same function as that of the probe in the AFM, with a very low stylus force, and detecting the position of the stylus 13 with an electrostatic capacitance sensor 14 (vertical resolution 0.02 nm). Detection in the horizontal direction is realized by employing a combination of two stages: a stage (not shown) driven (horizontal resolution 1 nm) by a piezoelectric device for measuring a micro area of up to 90 μm and a motor-driven stage (not shown) for measuring a macro area of up to 300 mm. Accordingly, stereoscopic shape measuring is realized.

Furthermore, there is a mode called a dipping mode, where the stylus 13 is brought down to a sample set at a measurement point and brought into contact until a predetermined stylus force is achieved, then after measurement, the stylus is elevated to be moved in the measuring direction and again brought down. The dipping mode enables sample measurement with a high aspect ratio.

An optical non-contact type detection profiler includes types adopting various optical methods. One of them is NewView manufactured by Zygo, which is a three-dimensional surface structure analyzing microscope. Detection of this microscope is realized by employing a Mirou interferometer as shown in FIGS. 7 and 8. As shown in the drawings, an interferometer-type objective lens 7 is constructed with a half mirror 11 and an internal reference mirror 12 for producing a reference beam. The reference beam and reflection light from the surface of the measurement target 1 are extracted by a beam splitter 5, and an interference figure is generated on a photoreceptor (CCD camera 8) positioned on a surface of the measurement target 1. In this apparatus, a halogen lamp serving as a white light source is used as the light source 4 to pick up a white interference figure. However, with an addition of a wavelength filter, monochromatic illumination may be used to enable topological measurement. For vertical detection, the objective lens 7 is driven by a piezoelectric device of a vertical scan driving unit 6, and the driving position is controlled in a closed loop by an electrostatic capacitance sensor (not shown), and in addition, interference figures on plural focus surfaces are inputted to a computer to be subjected to frequency domain analysis (FDA) using fast Fourier transformation (FFT), which is uniquely developed by Zygo, to obtain height data at a vertical resolution of 0.1 nm. A horizontal resolution (maximum of 0.1 µm/pixel) and a detection range in the horizontal direction are determined by a pixel pitch of the CCD camera 8 and an image forming magnification between the measurement target 1 and CCD camera 8 in the optical system.

In the process control of CMP, a profiler employed may be of an optical type or a non-optical type, such as an AFM or a stylus profiler, or the like, as long as it satisfies specific accuracy. To give priority to a resolution in the horizontal direction, non-optical profilers, such as an AFM or a stylus profiler, are advantageous.

The reason thereof is in that since a resolution in the horizontal direction is determined by an optical condition (NA, λ) of an optical profiler, resolution of 100 nm or less cannot be achieved. On the contrary, for instance, an end of a probe of an AFM, which possibly comes in contact with a sample (measurement target), has a radius of 5 to 20 nm, thus, apparently has a superior horizontal resolution to that of an optical profiler.

For the above-described reason, it is a current situation to use a non-optical profiler, such as an AFM or a stylus profiler, to achieve measurement of the horizontal direction at the highest resolution and to control processing of CMP, or the like, with high accuracy.

In addition, as an integrated circuit becomes highly integrated and highly dense as mentioned above, accurate alignment of a reticle and wafer is required. In order to meet this demand, Japanese Patent Application Laid-Open (KOKAI) No. 2000-228356 discloses a method of using a surface shape measuring system, such as an AFM, or the like, to calculate an alignment offset value after a surface-film is formed on a mark-formed portion of a measurement target, and to detect the position of the film-formed mark by using this offset value.

However, if an AFM or a stylus profiler is employed to give priority to a resolution in the horizontal direction, there is a possibility of contamination of a wafer surface.

When using an AFM or a stylus profiler, there is a case that a probe used for measurement strongly comes in contact with the wafer surface when it is not in use.

For instance, an AFM uses an atomic force as a measurement value, as its name implies. When the probe of the AFM moves from the current measurement point to a next measurement point, the distance between the probe and wafer becomes close due to a concave and a convex shape of the alignment mark on a wafer as shown in FIG. 9. Since the probe strongly comes in contact with the wafer surface, a predetermined atomic force is not generated. Therefore, the probe is elevated to a distance in which an atomic force is generated, and a measurement value is obtained. Although the circumstance depends upon the shape of an alignment mark, there are many cases that the distance varies more than a distance where an atomic force is generated. Therefore, in reality, such a circumstance of the probe strongly contacting the measuring surface often happens. If this causes a change in the shape of the probe, the measurement value changes. This is a factor that determines the life of a probe. The more micro the end shape of the probe is, the shorter the life of the probe is.

Herein, a probe is made of silicon. If this probe strongly comes in contact with a wafer used in CMP process control, the possibility of contamination cannot be denied. Furthermore, in a case of measuring a resist surface, a strong contact of a probe may damage the resist surface, as a resist is softer than silicon.

For this reason, in the current CMP process control, the wafer measured by an AFM, or the like, is discarded after measurement, without being returned to the process line, since it may be contaminated. Although the contamination may completely be eliminated by cleaning the wafer after measurement, the time necessary for cleaning causes a reduced throughput in the entire semiconductor device production line.

SUMMARY OF THE INVENTION

The present invention has been proposed to solve the conventional problems, and has as its object to measure a shape of a surface with high accuracy, but without contaminating or damaging the surface of a target.

Another object of the present invention is to efficiently detect an alignment offset value after a surface-film is formed on a mark-formed portion of a target, thereby realizing high-speed alignment with high accuracy.

Note in this specification, an AFM or a stylus profiler will be referred to as a contactable profiler, and an optical profiler adopting a non-contact measurement scheme will be referred to as a non-contactable profiler.

In order to achieve the above objects, according to the stereoscopic shape measuring apparatus and method of the present invention, when a shape of a surface of a target is measured, a non-contactable first measuring unit such as an optical profiler, or the like (e.g., a Mirou interferometer method) measures without contacting the surface of the target, and a contactable second measuring unit (a contact to the target is allowed) such as an AFM or a stylus profiler, or the like, measures again, by using the measurement result of the first measuring unit. To realize this measurement, the shape measuring apparatus of the present invention comprises an operation control unit for controlling a measuring operation of the second measuring unit.

In a case where an optical profiler adopting the above-mentioned Mirou interferometer method is employed as the first measuring unit, an observation beam is irradiated to the surface of the target, then a part of the observation beam is extracted by a half mirror as a reference beam before the observation beam reflects on the target, and an interference figure between the reference beam and reflection light reflected on the surface of the target is picked up by a photoreceptor such as a CCD camera, thereby measuring a height of the surface of the target.

Furthermore, in a case where an aforementioned AFM is employed as the second measuring unit, relative alignment is performed between the surface of the measurement target and the end of a probe of the atomic force microscope, which detects the height of the surface of the target, based on the measurement result of the first measuring unit, then the surface of the target is scanned in a manner such that the probe end does not come in contact with the surface of the target, and the height of the probe is detected at a position where atomic force acts on the probe.

On the other hand, in a case where an aforementioned stylus profiler is employed as the second measuring unit, relative alignment is performed between the surface of the target and the end of a stylus of the stylus profiler, which detects the height of the surface of the target, based on the measurement result of the first measuring unit, then the surface of the target is scanned in a manner such that the stylus force of the stylus end that comes in contact with the surface of the target does not exceed 50 nN, and the height of the stylus is detected when the stylus comes in contact with the surface of the target.

Furthermore, according to the present invention, it is preferable to adjust the surface scanning speed of the probe or stylus in accordance with an existence or absence of a concavity and convexity, or steps on the surface of the target, which is obtained from the measurement result of the first measuring unit. More specifically, using the measurement result of the first measuring unit, the scanning speed of the probe or stylus is increased in an area where the surface is flat, whereas the scanning speed is decreased in an area where steps or concavity and convexity exist, particularly in the area where an alignment mark is formed on a semiconductor wafer.

Furthermore, according to the present invention, when the surface of the target is scanned, it is preferable to operate in the aforementioned tapping mode or dipping mode, i.e., detecting a position where atomic force acts or a position where the probe or stylus comes in contact with the surface of the target while vertically oscillating the probe or stylus.

An aligning method according to the present invention is utilized to perform relative alignment between a first object and a second object by an alignment detection system, when a pattern on the first object is transferred onto the resist-coated second object. The aligning method is characterized by obtaining an alignment offset value of the alignment-mark-formed portion of the resist-coated second object with the use of the aforementioned stereoscopic shape measuring apparatus, and using the obtained alignment offset value in the relative alignment operation. According to this method, it is possible to eliminate the possibility of contamination of the wafer surface, caused by using a contactable profiler such as an AFM or a stylus profiler in the CMP process control.

Furthermore, the present invention is applicable to an aligner (an exposure apparatus), which employs either the above-described stereoscopic shape measuring apparatus or the method to perform alignment between a substrate and an original plate to expose and transfer a pattern of the original plate onto the substrate.

Furthermore, the present invention is applicable to a semiconductor device manufacturing method, which comprises the step of installing manufacturing machines for performing various processes, including the aforementioned aligner (exposure apparatus), in a semiconductor manufacturing factory, and the step of manufacturing a semiconductor device in a plurality of processes by using the manufacturing machines. It is preferable to further comprise the steps of connecting the aforementioned manufacturing machines through a local area network, and the step of communicating information related to at least one of the manufacturing machines between the local area network and an external network outside the semiconductor manufacturing factory. Moreover, it is preferable to perform production management by obtaining maintenance information of the manufacturing machines through data communication, which is realized by accessing a database provided by a vendor of the aligner (exposure apparatus) or a user through the external network, or by data communication between the aforementioned semiconductor manufacturing factory and another semiconductor manufacturing factory through the external network.

Furthermore, the present invention is applicable to a semiconductor manufacturing factory, including manufacturing machines for performing various processes, including the aforementioned aligner (exposure apparatus), a local area network connecting the manufacturing machines, and a gateway enabling the local area network to access an external network outside the factory, which enables data communication with regard to information related to at least one of the manufacturing machines.

Furthermore, the present invention provides a maintenance method of an aligner installed in a semiconductor manufacturing factory. The maintenance method comprises the step of providing, by a vendor of the aligner (exposure apparatus) or a user, a maintenance database connected to an external network outside the semiconductor manufacturing factory, the step of permitting the semiconductor manufacturing factory an access to the maintenance database through the external network, and the step of transmitting maintenance information stored in the maintenance database to the semiconductor manufacturing factory through the external network.

Furthermore, the present invention is applicable to an aligner (exposure apparatus) comprising a display monitor, a network interface, and a computer executing network software, which enables data communication regarding maintenance information of the aligner (exposure apparatus) through a computer network. It is preferable that the network software provides a user interface on the display monitor for accessing a maintenance database, which is provided by a vendor of the aligner (exposure apparatus) or a user and connected to an external network outside the factory where the aligner (exposure apparatus) is installed, thereby enabling data acquisition from the database through the external network.

According to the present invention, in a case of measuring a shape of a surface, such as a mark on a wafer, or the like, highly accurate stereoscopic shape measurement is possible without contaminating a surface of a target. This is realized by measuring the surface shape in advance with a non-contactable first measuring unit, then measuring the surface shape in the horizontal direction with a contactable second measuring unit having a high resolution, and performing control based on the measurement result of the first measuring unit.

Other objects and advantages besides those discussed above shall be apparent to those skilled in the art from the description of a preferred embodiment of the invention which follows. In the description, reference is made to the accompanying drawings, which form a part thereof, and which illustrate an example of the invention. Such an example, however, is not exhaustive of the various embodiments of the invention, and therefore reference is made to the claims which follows the description for determining the scope of the invention.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

First Embodiment

Preferred embodiments of the present invention will now be described in detail in accordance with the accompanying drawings.

Figure 1:
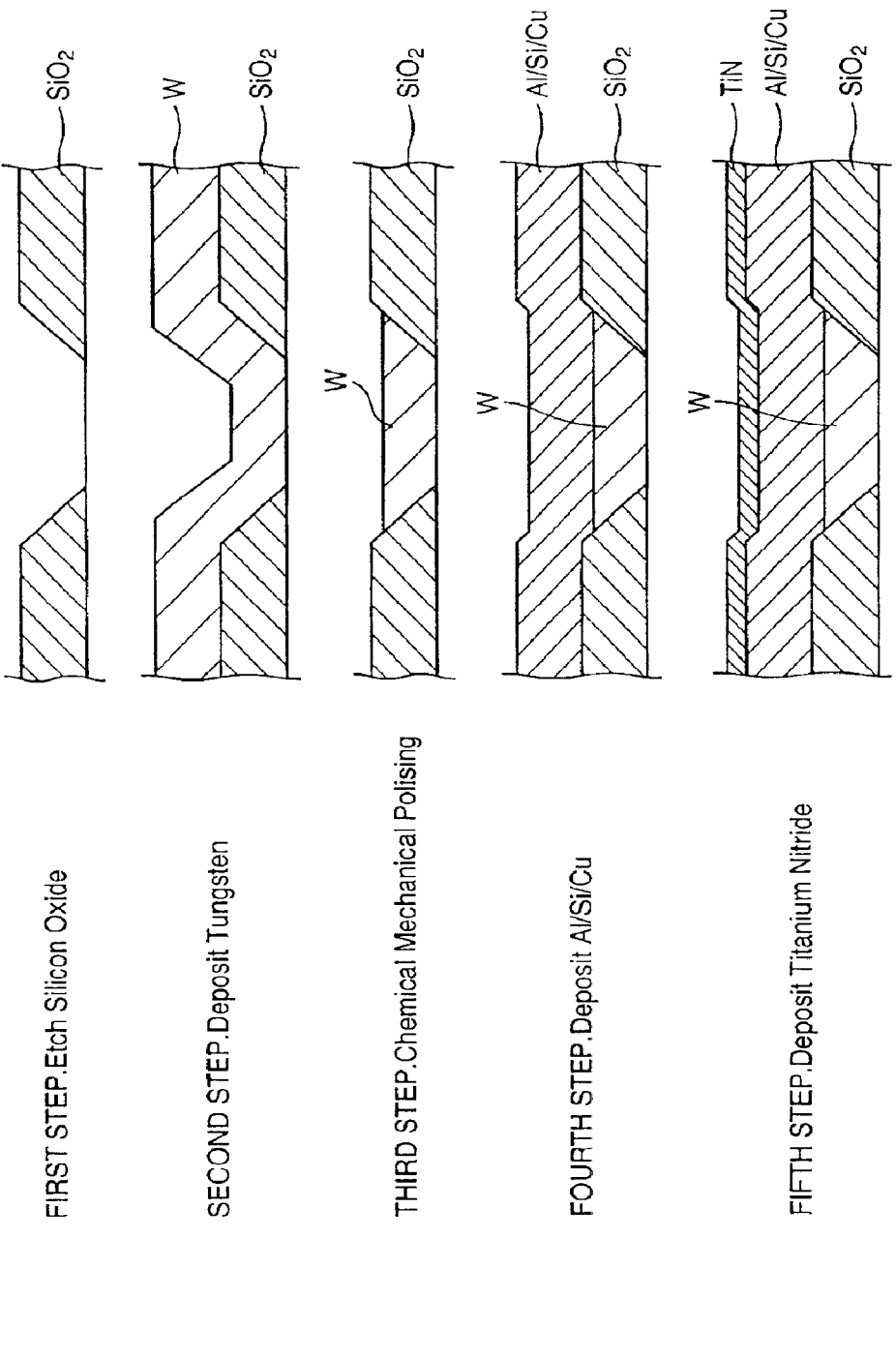
FIG. 1 is a view showing a structure of an alignment mark, which is called metal CMP.
Figure 2:
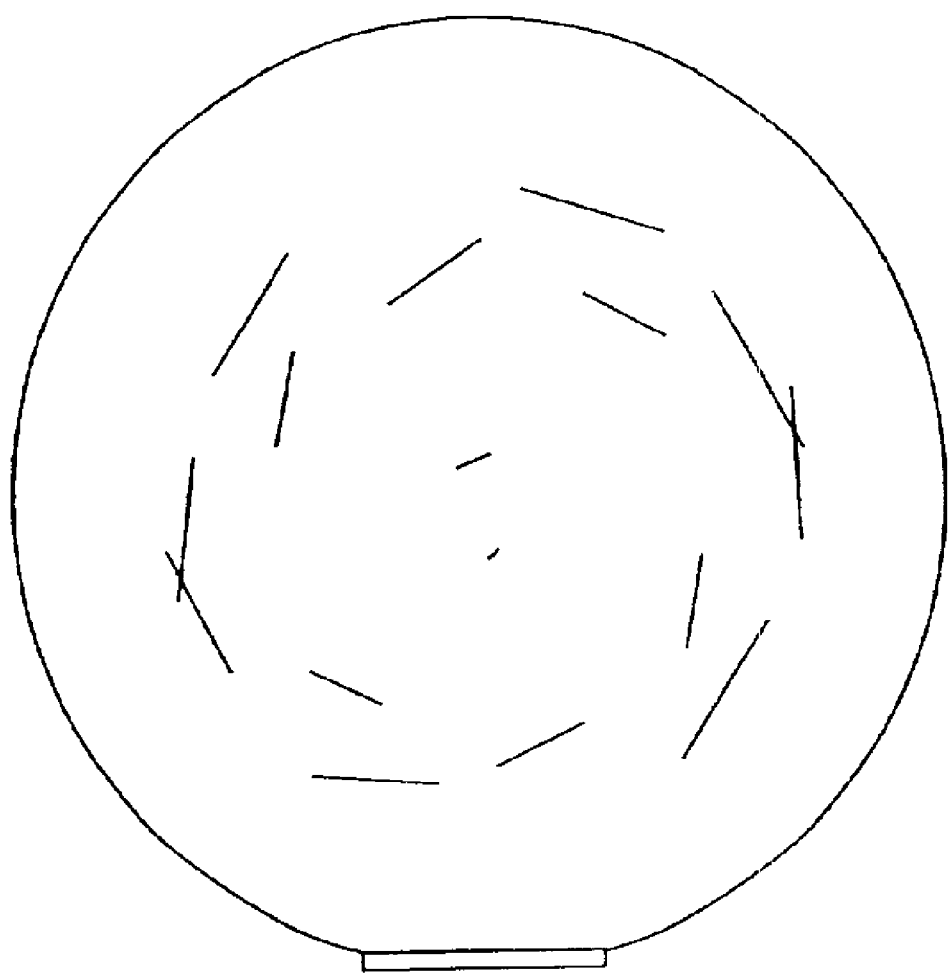
FIG. 2 is a view showing an example of an alignment error that is a rotating error.
Figure 3:
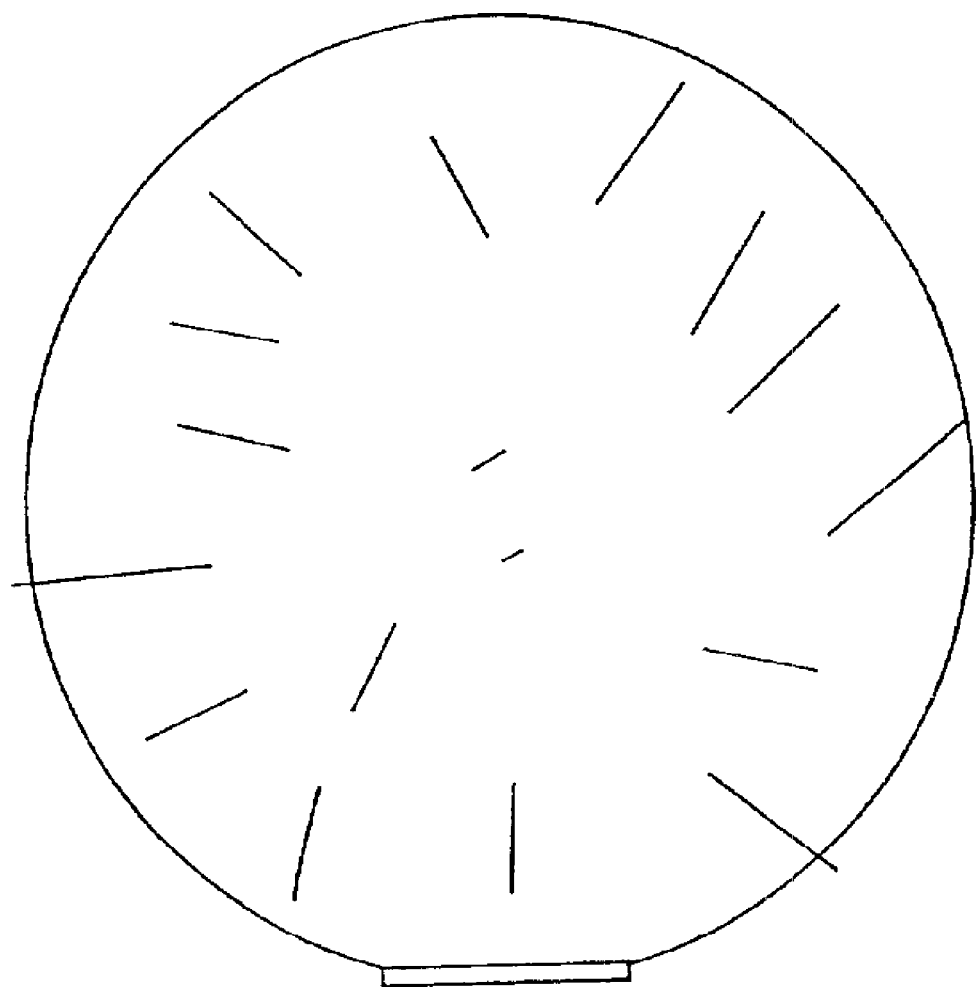
FIG. 3 is a view showing an example of an alignment error that is a magnification error.
Figure 4:
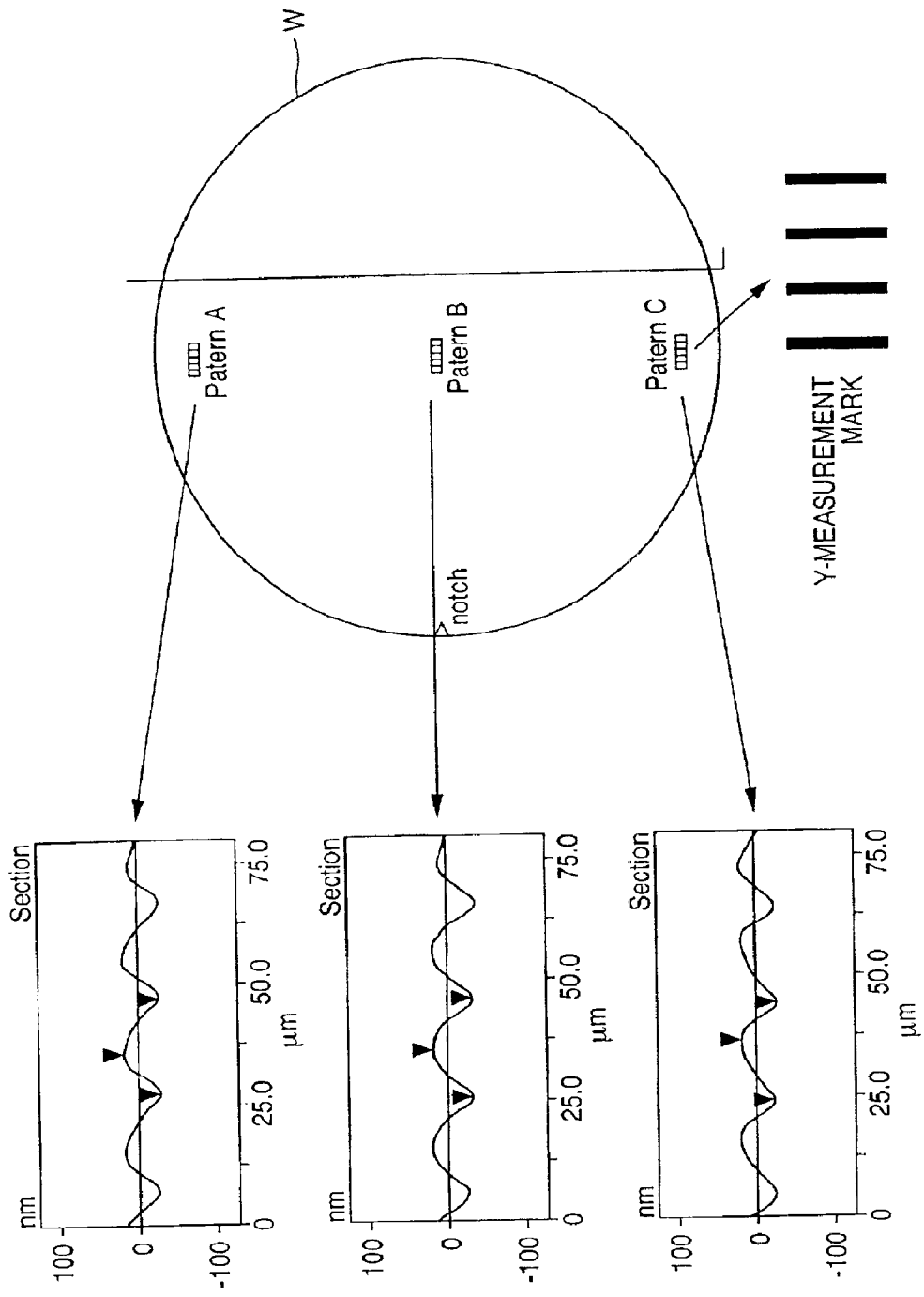
FIG. 4 is a view showing data obtained by measuring actual alignment marks by an AFM.
Figure 5:
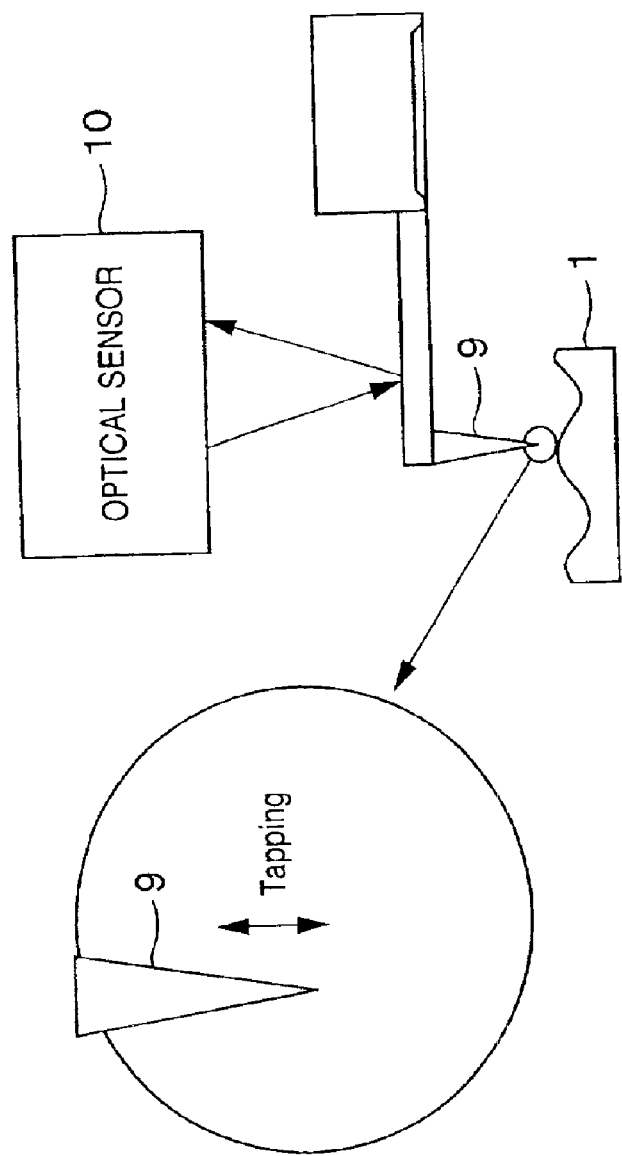
FIG. 5 is a view showing a structure of an AFM.
Figure 6:
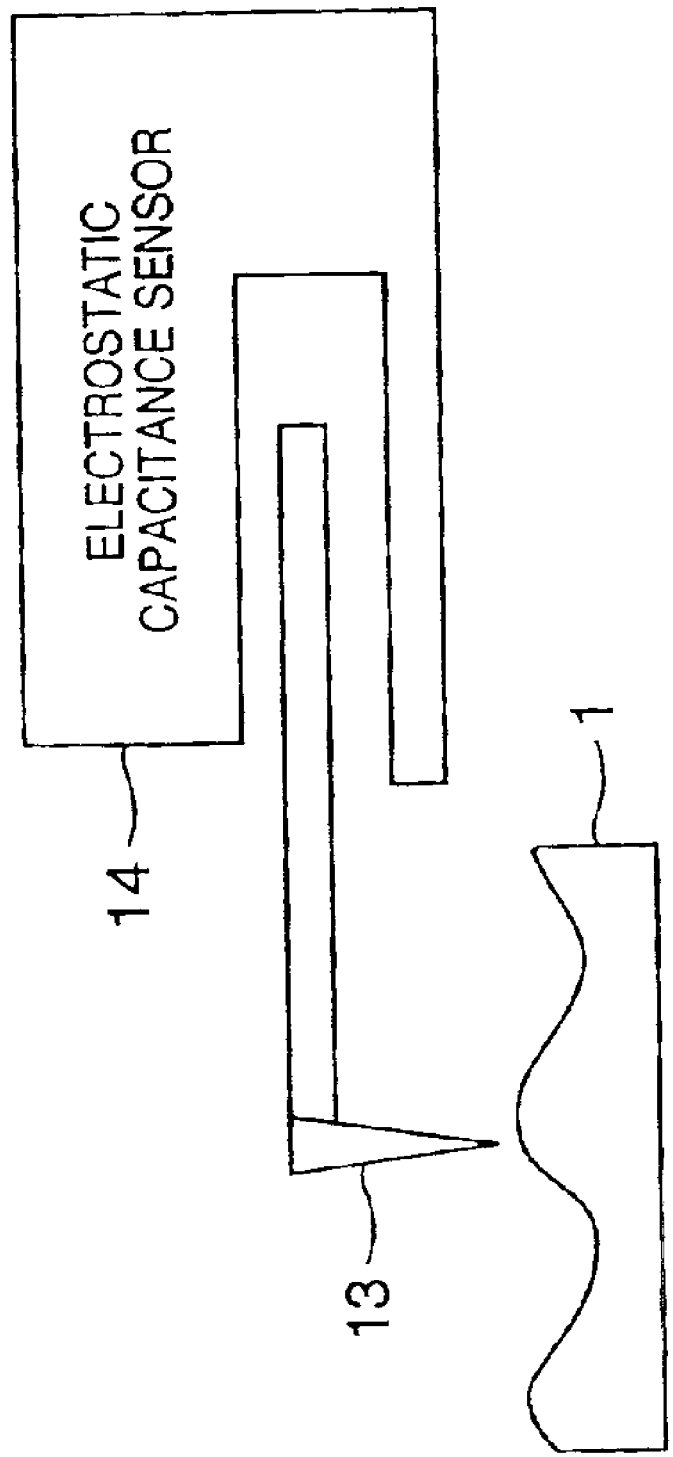
FIG. 6 is a view showing a structure of an HRP.
Figure 7:
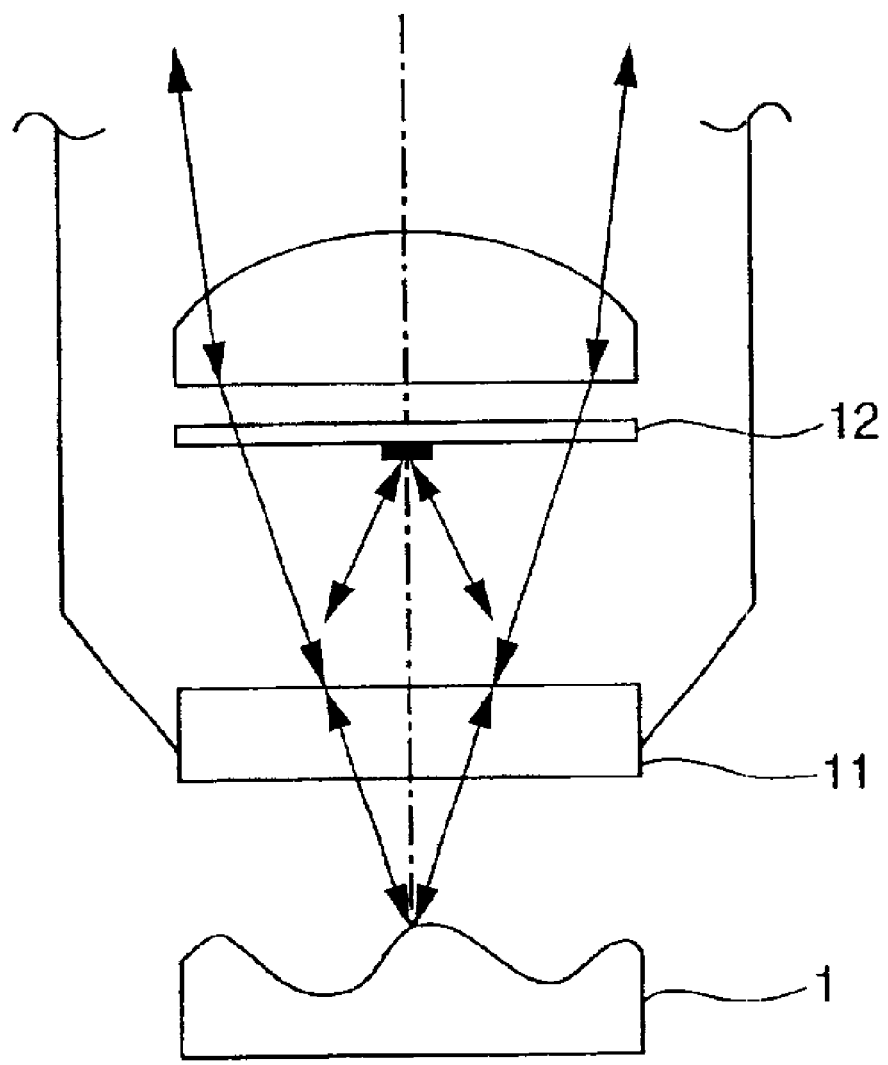
FIG. 7 is a view showing a structure around an objective lens of a Mirou interferometer.
Figure 8:
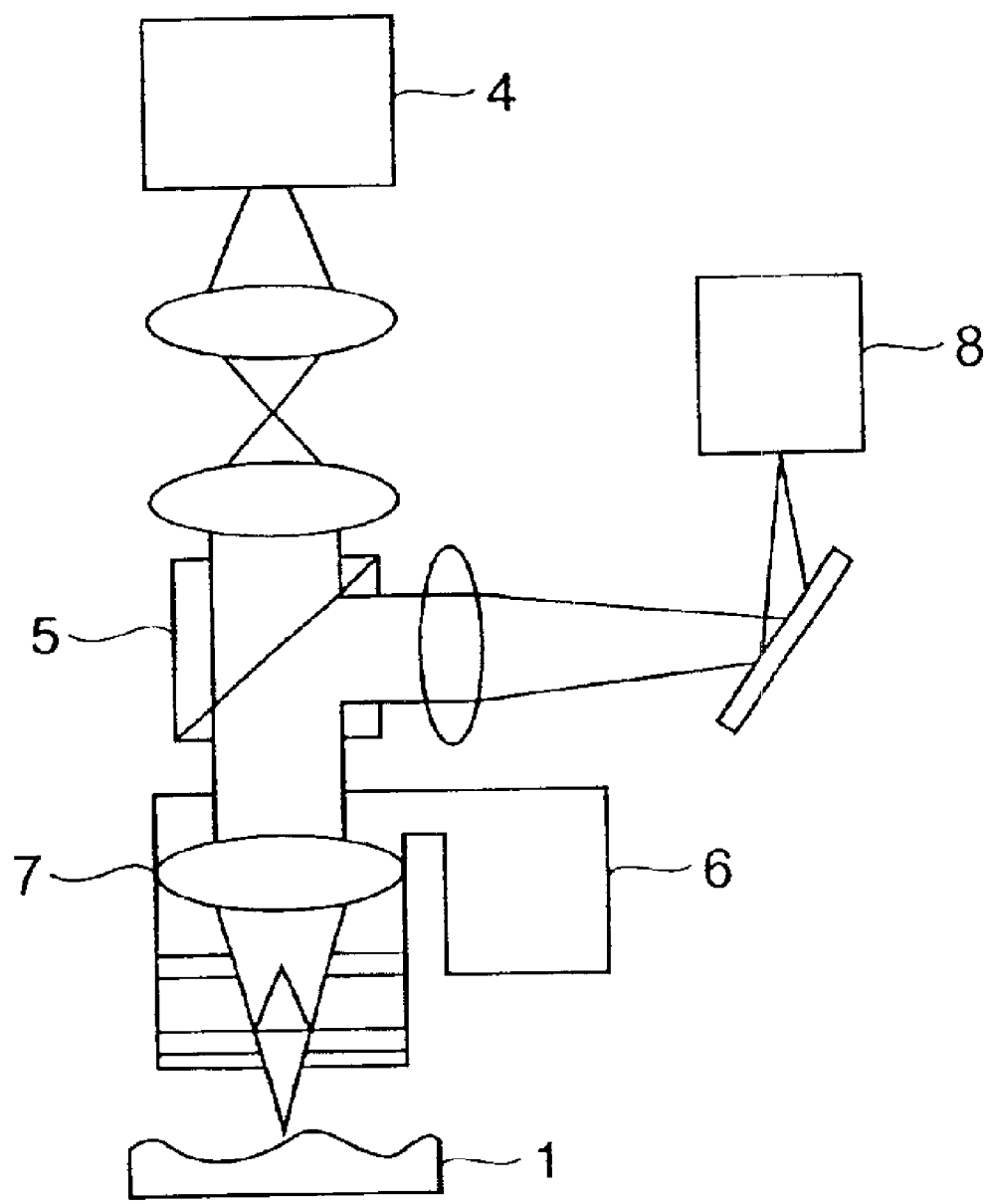
FIG. 8 is a view showing an entire structure of the Mirou interferometer.
Figure 9:
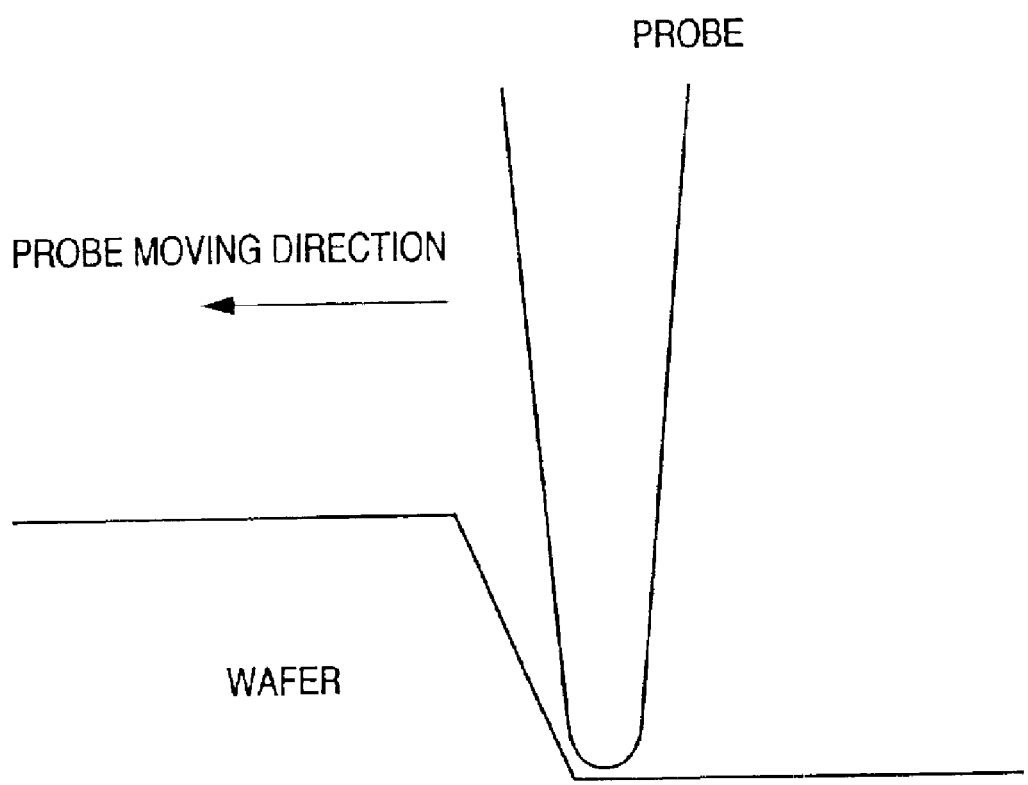
FIG. 9 is a view showing an AFM probe and a measuring sample.
Figure 10:
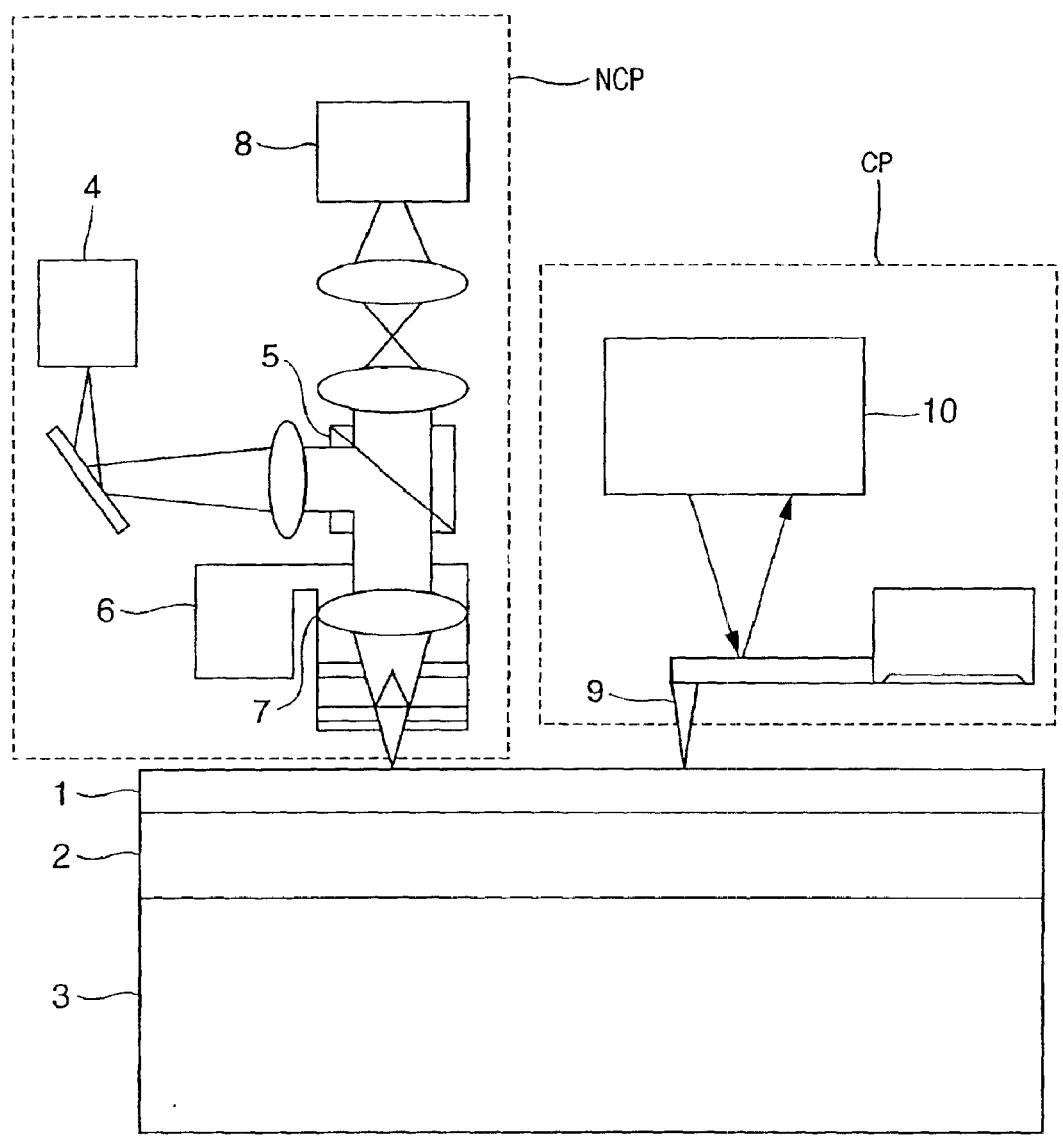
FIG. 10 is a view showing a structure of a stereoscopic measuring system according to the present invention.
Figure 11:
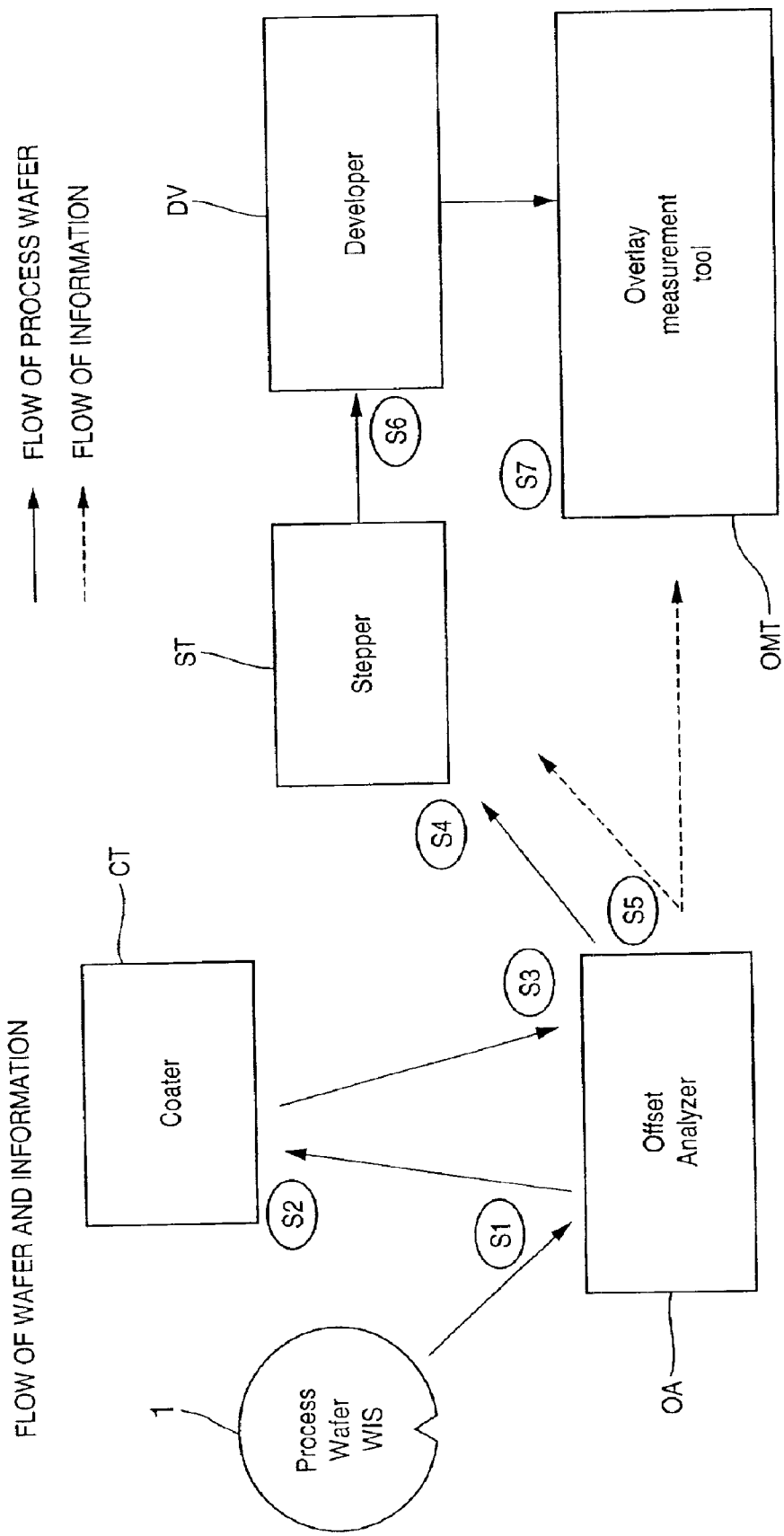
FIG. 11 is a conceptual view showing a flow of a wafer and information when measuring an actual device by providing an offset analyzer.

FIG. 10 shows an embodiment of a stereoscopic shape measuring system according to the present invention. In FIG. 10, reference letter NCP denotes a non-contactable profiler, which is an optical profiler employing a Mirou interferometer such as that shown in FIGS. 7 and 8. Reference letter CP denotes a contactable profiler (contact to a measurement target is allowed), having the same structure as that of the AFM shown in FIG. 5.

Next, the measurement steps performed by the stereoscopic shape measuring system according to the first embodiment are described.

First, the profiler NCP, which has no possibility of contacting a surface of a measurement target, measures a CMP wafer 1, conveyed by the stereoscopic shape measuring system according to the first embodiment and placed on a wafer chuck 2 on an X-Y stage 3 having an XY-direction interferometer, which includes a Z tilt and a θ stage.

Next, a profiler CP, which has a possibility of contacting a surface of a measurement target, measures the CMP wafer 1. More specifically, the surface of the wafer 1 is scanned in a predetermined direction with a probe 9 by moving the X-Y stage 3, and an optical sensor 10 detects the height of the probe 9 when atomic force acts on the probe 9. Herein, the scanning speed of the probe 9 is increased in an area where the surface is flat, whereas the scanning speed is decreased when the probe 9 comes to a portion of steps. By virtue of this, the measurement time is reduced and a resolution of an important portion is increased. Since the probe 9 searches a height in which atomic force acts by being oscillated in the vertical direction at high speed, a resolution in the horizontal direction can be increased by decreasing the scanning speed.

In this stage, information about the surface shape of the CMP wafer 1 has already been ascertained by the non-contactable profiler NCP (although the resolution in the horizontal direction decreases). Based on this information, a probe initial value (distance between the CMP wafer 1 and probe 9) of an AFM, serving as the contactable profiler CP, is set.

Accordingly, even in a case where the distance between the CMP wafer 1 and probe 9 becomes short due to a sudden change in the surface shape of the measurement target 1, it can be controlled such that the probe 9 is set to keep a sufficient distance with the wafer to generate atomic force. As a result, it is possible to prevent the probe 9 from contacting the CMP wafer 1 with unnecessarily strong force. Therefore, contamination of the wafer 1 can be prevented. Furthermore, since such strong contact is prevented, the shape of the probe 9 is less likely to deteriorate over time. Therefore, stereoscopic shape measurement will not vary with time. Accordingly, measurement is realized with higher accuracy, and the life of the probe 9 is prolonged.

As described above, both the non-contactable profiler NCP and contactable profiler CP are employed as the stereoscopic shape measuring system, to first perform measurement with the non-contactable profiler NCP, then perform measurement with the contactable profiler CP based on obtained information. By virtue of this process, the possibility of contaminating the CMP wafer 1 is eliminated; high resolution is achieved in measurement in the horizontal direction; and controlling of the planarization process such as CMP can be performed with high accuracy.

Second Embodiment

As shown in FIG. 10, the stereoscopic shape measuring system according to the first embodiment is constructed with the non-contactable profiler NCP (optical profiler employing a Mirou interferometer) and the contactable profiler CP (AFM). Besides employing the non-contactable profiler NCP and contactable profiler CP as a single apparatus, the objects of the present invention can also be achieved by employing the noncontactable profiler NCP and contactable profiler CP separately and transmitting information about the measurement result of the non-contactable profiler NCP through a network, or offline, such as a floppy disk, or the like.

Furthermore, although the first embodiment has described an optical profiler employing a Mirou interferometer as the non-contactable profiler, NCP, the non-contactable profiler is not limited to this. For instance, a confocal detection system may be used, or a non-contact mode of the AFM may be used to achieve the objects of the present invention (in brief, a detection system that surely does not contact the measurement target may perform pre-measurement).

Furthermore, the contactable profiler is not limited to an AFM, as long as the profiler is controllable so as not to cause contamination of a wafer. For instance, a stylus profiler may be controlled such that the stylus force of contacting the wafer surface is always 50 nN or less. With the use of the stylus profiler, the shape of the wafer surface can be measured in a manner similar to the above-described AFM.

Embodiment of Offset Analyzer

Next, a description is provided of a case wherein the stereoscopic shape measuring system of the present invention, described in the above embodiments, is applied to an offset analyzer employed in semiconductor device manufacturing.

Note in the following description, an aligner (an exposure apparatus) will be called a stepper; an alignment detection system of an aligning device incorporated in the aligner will be called an alignment scope; and a device that pre-measures a wafer outside the aligning device will be called an offset analyzer.

In the offset analyzer, the shape of the wafer surface is measured before and after resist coating. Based on a three-dimensional relative positional relation of the measured resist and wafer marks, an alignment offset is calculated in time for a signal of the alignment detection system of the aligning device. Although an optical offset analyzer may be used for detection, the detection may be realized by a method achieving a high resolution, such as a scan-type tunnel microscope disclosed in Japanese Patent No. 2,735,632, or an atomic force microscope (AFM) disclosed in U.S. Pat. No. 5,508,527. An AFM incorporated in an aligner has conventionally been known. The embodiment of the present invention employs an AFM having a high resolution.

Hereinafter, a description is provided of the flow of a wafer and information in semiconductor device manufacturing, when the offset analyzer of the present embodiment performs measuring. According to this embodiment, patterns having a plurality of shapes, which require the highest overlay accuracy, an alignment mark, and a mark provided for an overlay measurement tool (hereinafter referred to as an OMT mark) are measured, and a mutual offset is obtained by comparing each of the measured results, thereby reducing a wafer induced shift (WIS) that is a wafer process error in semiconductor manufacturing.

First, as indicated by step S1, the wafer 1 is transferred to an offset analyzer OA before resist coating. A relative positional relation between the aforementioned plural patterns and the alignment mark or OMT mark on the wafer 1 are measured by an AFM, or the like. Although an actual device is directly measured in this embodiment, a resist pattern generated with a dedicated reticle may be inserted within a scanning range of the AFM to be subjected to measurement. In this embodiment, since the X-Y stage of the offset analyzer OA moves in a wide range, it is preferable to detect in advance the marked position with high accuracy by a microscope, or the like, and scan only the neighborhood of the marked position with high accuracy. In this manner, before resist coating the wafer, a positional relation among, for instance, a gate pattern, the OMT mark, and the alignment mark is measured with the X-Y stage as a reference.

Next, in step S2, the wafer 1 is transferred to coater CT for resist coating. In step S3, the wafer 1 is transferred again to the offset analyzer OA for measuring the resist shape of the alignment mark by the AFM.

In step S4, the wafer 1 is transferred to a stepper ST, where an alignment mark signal is detected by an alignment scope.

In step S5, based on a three-dimensional relative positional relation between the wafer mark and resist shape, which is obtained in advance by the offset analyzer OA and measured before and after the resist coating, as well as the alignment mark signal obtained by the alignment scope, a relation between the alignment mark signal and wafer mark position is obtained to calculate an offset of alignment measurement. The calculated offset is transferred to the stepper ST. The stepper ST performs alignment and exposure based on the offset. Upon completing exposure of all shots, in step S6, the wafer 1 is conveyed to a developer DV for development. After development is performed, in step S7, the offset obtained in step S1 is used to separate a distortion component from an alignment component, and total overlay inspection is performed. As mentioned above, since there is an offset between the OMT mark and a distortion of the patterns requiring the highest overly accuracy, the offset is a necessary parameter. Thereafter, a circuit is formed by a number of processes using known techniques, and finally, a semiconductor device is obtained.

Figure 12:
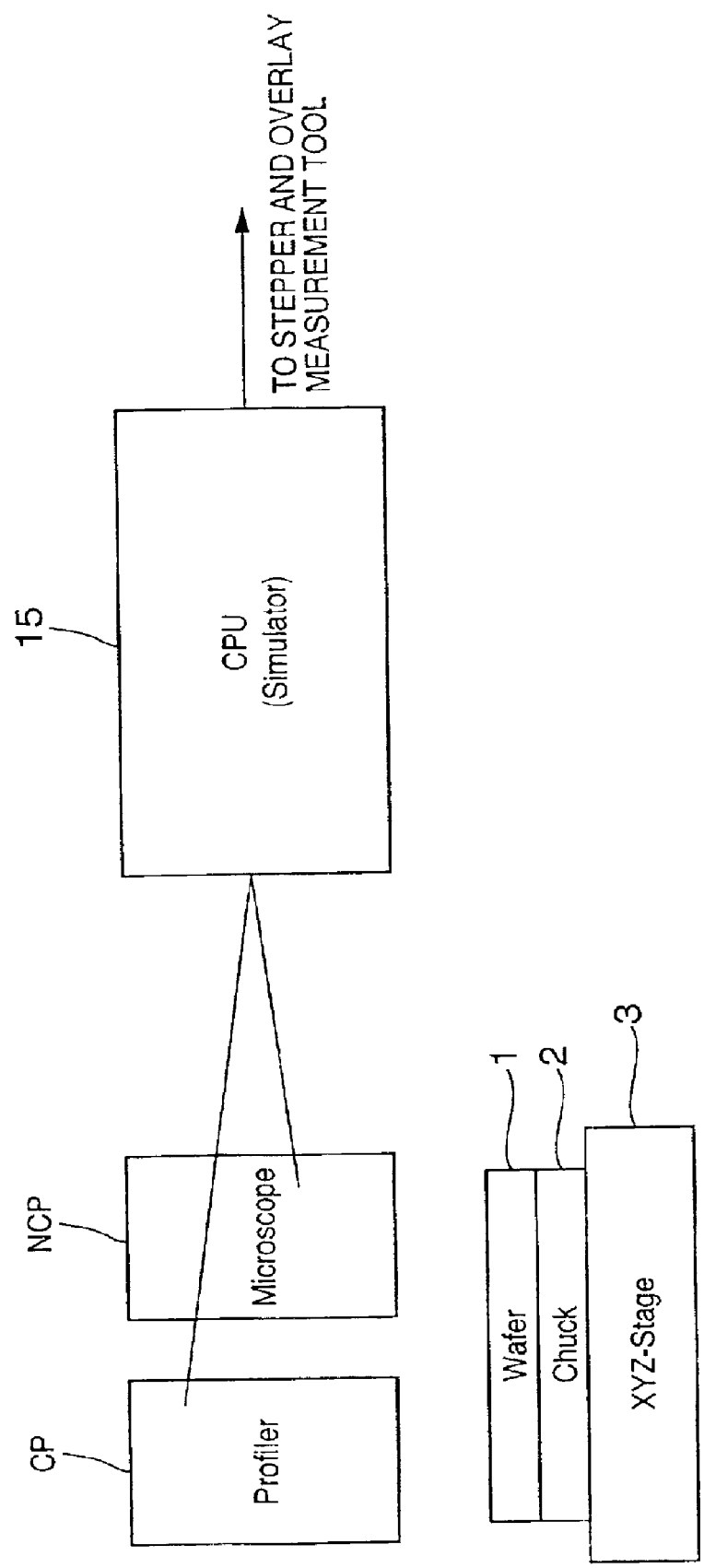
FIG. 12 is a conceptual view showing a hardware structure of the offset analyzer.

FIG. 12 shows a hardware structure of an offset analyzer to which the present invention is applied. As shown in FIG. 12, the offset analyzer is constructed with a chuck 2 which supports the wafer 1; an X-Y-Z stage 3 which three-dimensionally moves the chuck 2; a contactable profiler CP, such as an AFM or the like, which measures the surface of the wafer with/without resist coating; a non-contactable profiler NCP such as an optical profiler, or the like; and a CPU 15 which controls the entire offset analyzer and includes a simulator for calculating an offset of the alignment pattern based on a detected surface shape. The offset information calculated by the CPU 15 is transmitted to the stepper ST and overlay measurement tool OMT.

Figure 13:
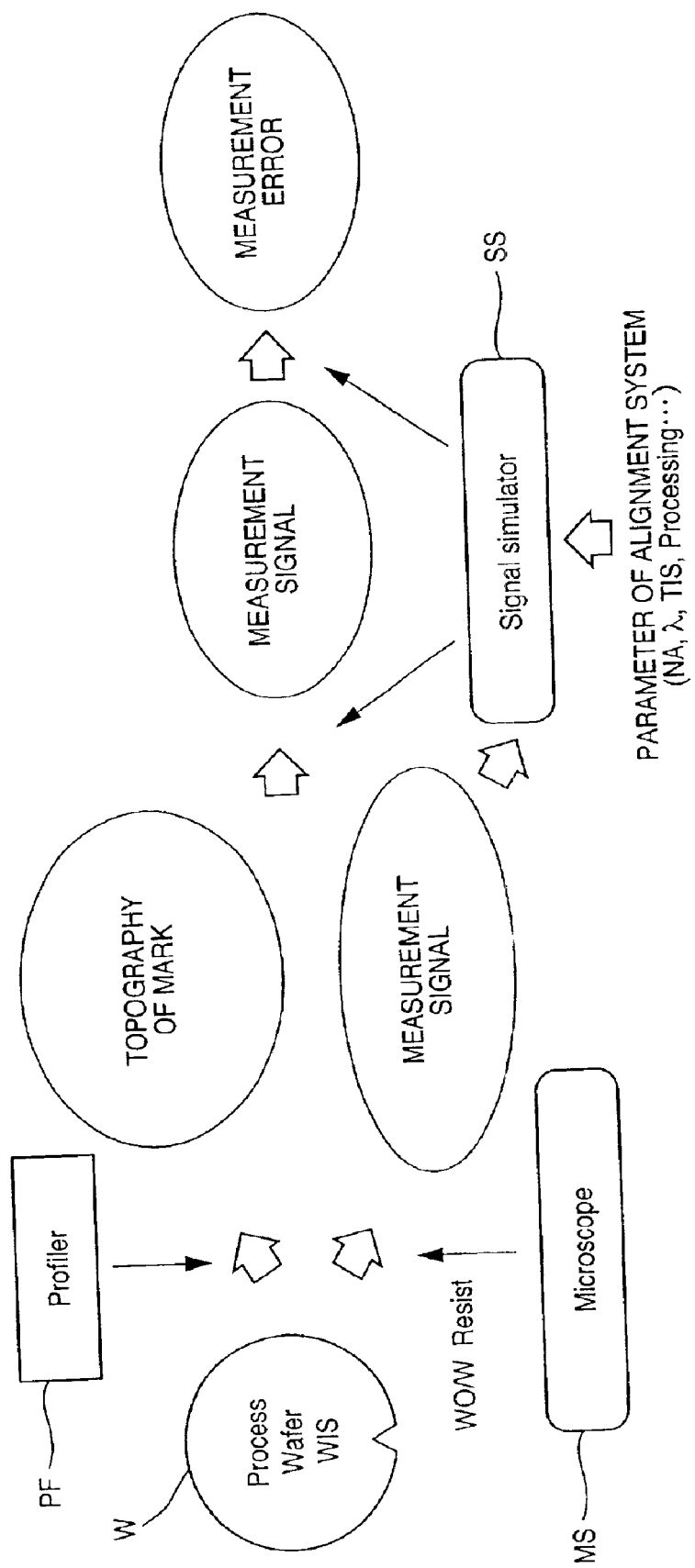
FIG. 13 is a view showing a flow of measurement and simulation in the offset analyzer.

FIG. 13 shows the flow of alignment-mark measurement and simulation in the offset analyzer shown in FIG. 12. First, a process wafer with or without resist coating (WO/W Resist) is subjected to alignment-mark measurement by a microscope, and a topography of the mark is measured by the profiler. The measurement signal of the microscope is transmitted to a signal simulator SS, which then simulates the measurement signal and measurement error while changing the NA, $\lambda$, TIS, process, and so forth.

The offset analyzer according to this embodiment can prevent deterioration of accuracy due to an asymmetrical shape of an alignment mark, caused by the wafer induced shift WIS. Therefore, semiconductor device formation is not influenced by a process such as CMP, or the like. Furthermore, since distortion measurement appropriate for actual circumstances is possible, highly accurate alignment that produces a high throughput can be realized. Moreover, since complicated optimization in the wafer process is not necessary, the cost of ownership (COO) can be improved.

Embodiment of a Semiconductor Production System

Next, a description is provided of an example of a production system of a semiconductor device (e.g., a semiconductor chip such as an IC or LSI, a liquid crystal panel, a CCD, a thin-film magnetic head, a micro machine, and so on), which employs the apparatus according to the present invention. According to this embodiment, trouble shooting or periodic maintenance of a manufacturing machine installed in a semiconductor manufacturing factory, or maintenance service, such as supplying software, is performed by using a computer network outside the factory.

Figure 14:
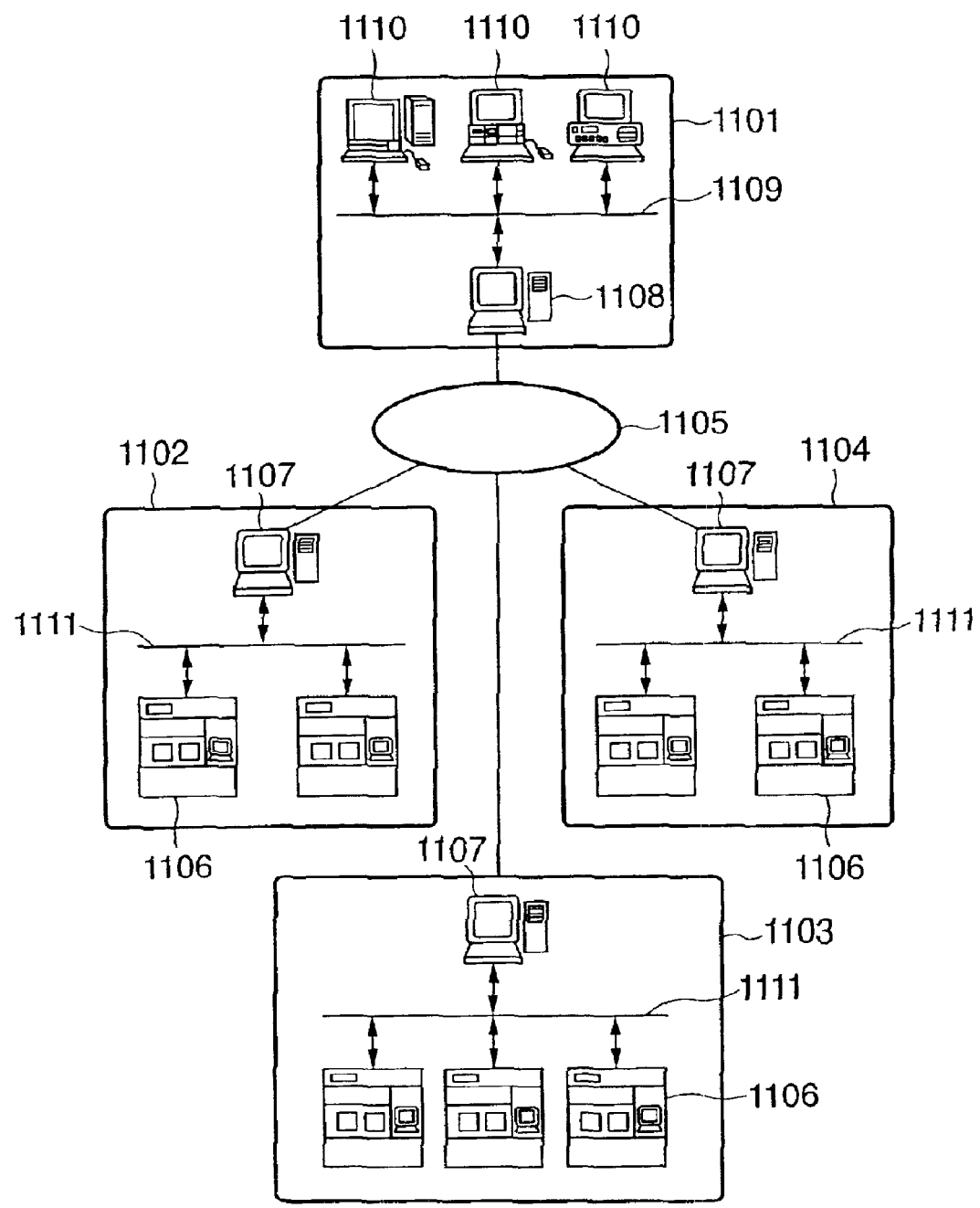
FIG. 14 is a conceptual view of a semiconductor device production system seen from one angle, which employs the apparatus according to the present invention.

FIG. 14 shows an entire semiconductor device production system seen from one angle. Reference numeral 1101 denotes an office of a vendor (supplier), which supplies semiconductor device manufacturing machines. Examples of the machines are semiconductor manufacturing machines for performing various processes in a semiconductor manufacturing factory, such as pre-process devices (e.g., an aligner, resist processors, a lithography device such as an etching device, a heat processor, a deposition device, a planarization device, and so on) and post-process devices (e.g., an assembling device, an inspection device, and so on). The office 1101 includes a host management system 1108 for providing a maintenance database of the manufacturing machines, plural operation terminal computers 1110, and a local area network (LAN) 1109, which constructs an intranet by connecting the aforementioned computers. The host management system 1108 includes a gateway to connect the LAN 1109 with an external network, i.e., Internet 1105, and a security function which limits external access.

Meanwhile, reference numerals 1102 to 1104 denote factories of a semiconductor manufacturer, namely, a user of the manufacturing machines. The manufacturing factories 1102 to 1104 may belong to different manufacturers, or a single manufacturer (e.g., a factory for pre-processes and a factory for post-processes). Each of the factories 1102 to 1104 includes a plurality of manufacturing machines 1106, a local area network (LAN) 1111, which constructs an intranet by connecting the machines 1106, and a host management system 1107 serving as a monitoring apparatus to monitor an operation condition of each manufacturing machine 1106. The host management system 1107 provided in each of the factories 1102 to 1104 includes a gateway to connect the LAN 1111 of each factory with an external network, i.e., Internet 1105. By virtue of the above construction, access to the host management system 1108 of the vendor 1101 is possible from the LAN 1111 of each factory via the Internet 1105. Access to the host management system 1108 is allowed only to limited users permitted by the security function. More specifically, status information indicative of an operation condition of each of the manufacturing machines 1106 (e.g., a symptom of a troubled apparatus) is notified from the factory to the vendor through the Internet 1105, and a response to the notification (e.g., instruction to cope with the trouble, or software and data for trouble shooting) or maintenance information is transmitted from the vendor to the factory. A communication protocol (TCP/IP) generally used in the Internet is adopted for the data communication between each of the factories 1102 to 1104 and vendor 1101, and for data communication within each factory through the LAN 1111. In place of the Internet serving as an external network of the factory, a high-security leased-line network (ISDN, or the like) that does not allow access of a third party may be used. Furthermore, the host management system is not limited to the one provided by a vendor. A database constructed by a user may be provided to an external network to allow access from the user's plural factories.

Figure 15:
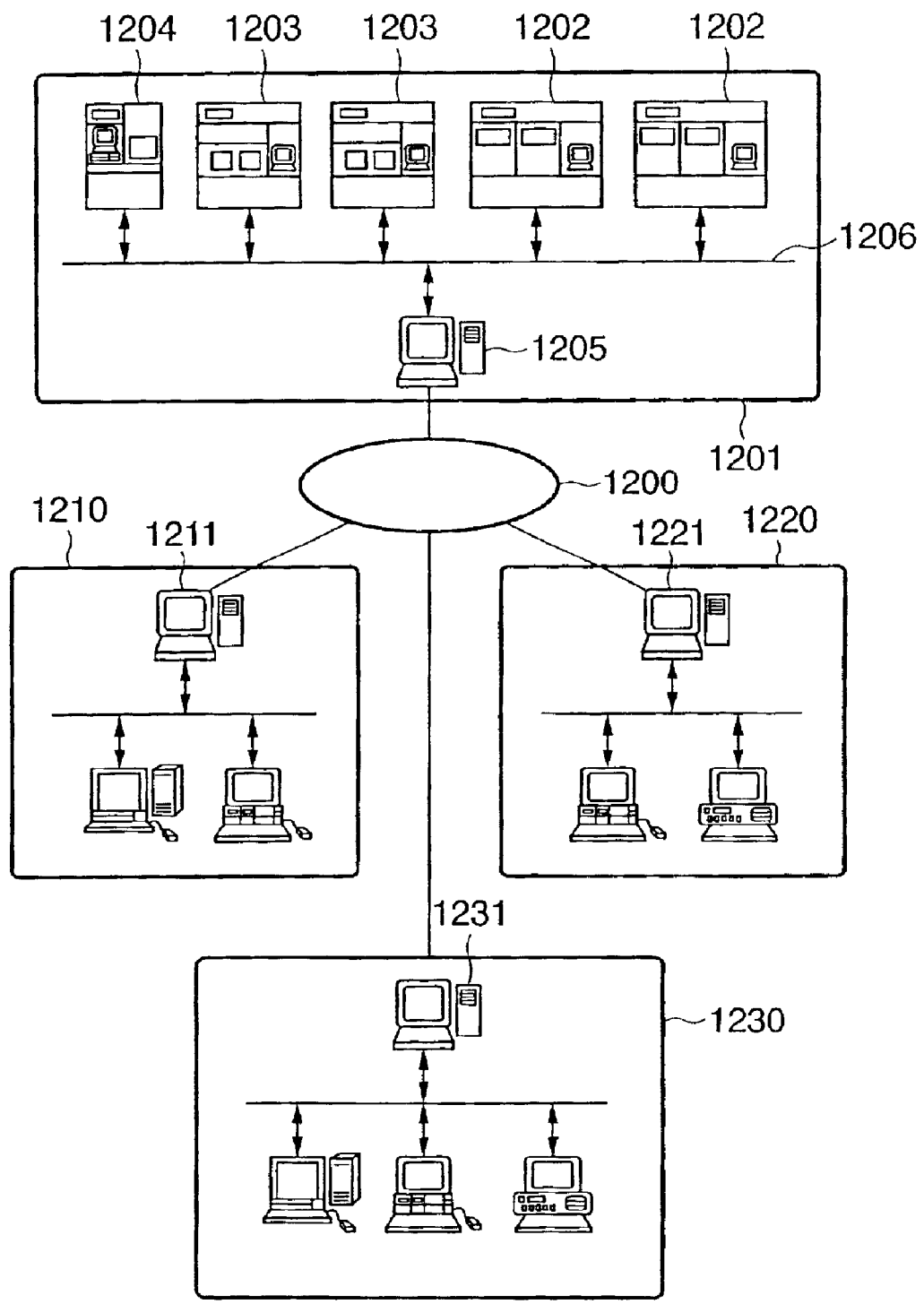
FIG. 15 is a conceptual view of the semiconductor device production system seen from another angle, which employs the apparatus according to the present invention.

FIG. 15 shows an entire semiconductor device production system seen from an angle different from that of FIG. 14. In the above example, plural user factories each having manufacturing machines are connected with the management system of the vendor through an external network, to communicate information regarding production management in each factory or information about at least one of the manufacturing machines. On the contrary, in the example shown in FIG. 15, a factory having manufacturing machines of plural different vendors is connected with management systems of respective vendors of the plural manufacturing machines through an external network to communicate maintenance information of each manufacturing machine. In FIG. 15, reference numeral 1201 denotes a manufacturing factory (semiconductor device manufacturer), namely, a user of the manufacturing machines. Provided in the production line of the factory are the manufacturing machines for performing various processes, for example, aligner 1202, resist processor 1203, and deposition device 1204. Note that although FIG. 15 shows only one factory 1201, in reality, plural factories are connected through the network. Each of the machines in the factory is connected by a LAN 1206, thereby constructing an intranet. A host management system 1205 controls an operation condition of the production line.

Meanwhile, offices of the respective vendors, e.g., aligner's manufacturer 1210, resist processor manufacturer 1220, and deposition device manufacturer 1230, comprise host management systems 1211, 1221, and 1231, respectively, to perform remote maintenance of the respective machines provided. Each host management system has a maintenance database and gateway to the external network as mentioned above. The host management system 1205, which manages each machine of the user's factory, is connected with the management systems 1211, 1221, and 1231 of the respective vendors through an external network 1200, i.e., the Internet, or a leased-line network. If trouble occurs in one of the series of manufacturing machines in the production line, operation of the production line is halted. However, the trouble may quickly be handled by receiving remote maintenance from the vendor of the troubled machine through the Internet 1200. Accordingly, the stoppage of the production line can be minimized.

Figure 16:
FIG. 16 shows a specific example of a user interface.

Each manufacturing machine installed in a semiconductor manufacturing factory comprises a display monitor, a network interface, software stored in a storage device for accessing a network, and a computer for executing software to operate the machine. For the storage device, a built-in memory, hard disk, or network file server may be used. The software for accessing a network includes a multipurpose or exclusive web browser. Such software provides a user interface, such as that shown in FIG. 16, on the display monitor. With the user of this interface, an operator managing the manufacturing machines in each factory inputs information, e.g., model 1401 of the manufacturing machine, serial number 1402, title of the trouble 1403, date 1404, level of urgency 1405, symptom 1406, trouble shooting method 1407, follow-up 1408, and so on, in the respective areas of the screen. The inputted information is transmitted to the maintenance database through the Internet, and in response, appropriate maintenance information is returned from the maintenance database and displayed on the monitor. Moreover, the user interface provided by the web browser realizes hyperlink functions 1410 to 1412 shown in FIG. 16. An operator can access more detailed information of each item, download the latest version of software for the manufacturing machine from a software library provided by the vendor, or pull up an operation guide (help information) as a reference for a factory operator. Herein, the maintenance information provided by the maintenance database includes information related to the present invention described above. In addition, the software library provides the latest software for realizing the present invention.

Figure 17:
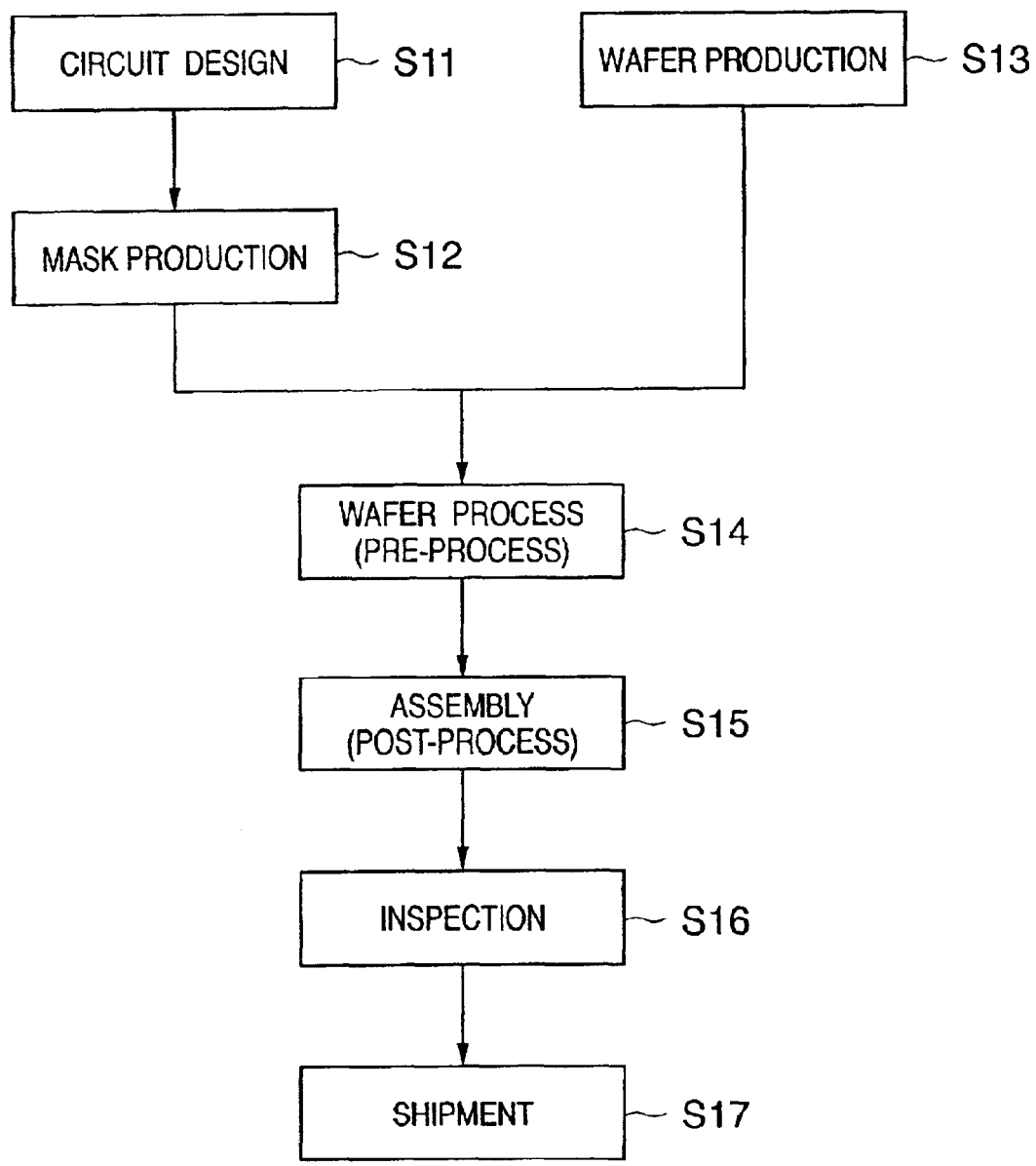
FIG. 17 is an explanatory view showing a flow of a semiconductor device manufacturing process.

Next, a description is provided of a manufacturing process of a semiconductor device, utilizing the above-described production system. FIG. 17 shows a flow of an overall semiconductor device manufacturing process. In step S11 (circuit design), a circuit of a semiconductor device is designed. In step S12 (mask production), a mask on which the designed circuit pattern is formed is produced. In step S13 (wafer production), a wafer is produced with a material such as silicon. In step S14 (wafer process), which is called a pre-process, an actual circuit is formed on the wafer with the use of the mask and wafer by a lithography technique. In step S15 (assembly), which is called a post-process, a semiconductor chip is produced by using the produced wafer. Step S15 includes an assembling process (dicing and bonding), a packaging process (chip embedding), and so on. In step S16 (inspection), the semiconductor device manufactured in step S15 is subjected to inspection such as an operation-check test, a durability test, and so on. The semiconductor device manufactured in the foregoing processes is shipped (step S17). The pre-process and post-process are executed in different dedicated factories. Each of these factories can receive maintenance services of the above-described remote maintenance system. Among these pre-process factories and post-process factories, information related to production management or machine maintenance is communicated through the Internet or leased-line network.

Figure 18:
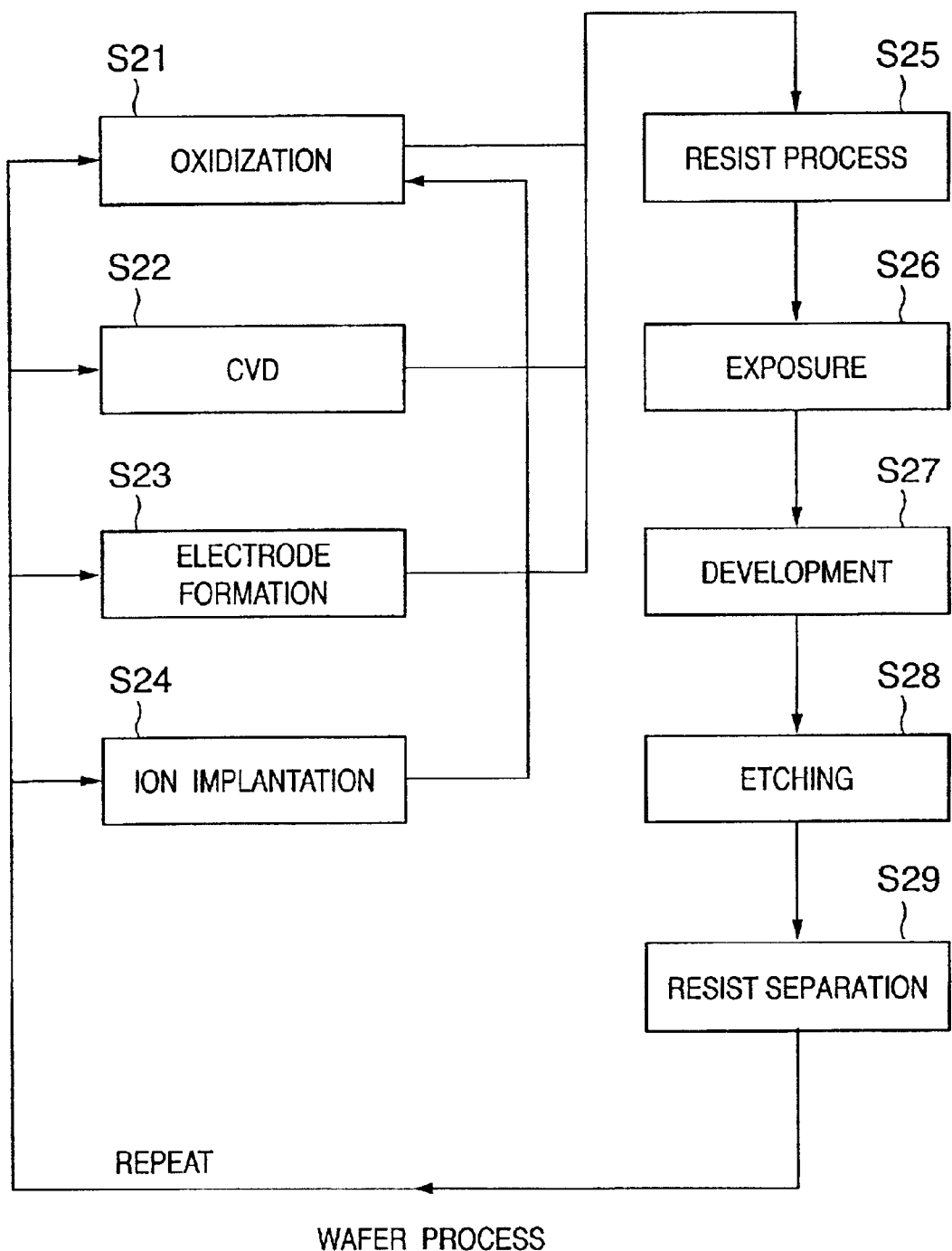
FIG. 18 is an explanatory view of a wafer process.

FIG. 18 shows a flow of the aforementioned wafer process in detail. In step S21 (oxidization), the wafer surface is oxidized. In step S22 (CVD), an insulating film is deposited on the wafer surface. In step S23 (electrode formation), an electrode is deposited on the wafer. In step S24 (ion implantation), ions are implanted on the wafer. In step S25 (resist process), a photosensitive agent is coated on the wafer. In step S26 (exposure), the circuit pattern on the mask is exposed and printed on the wafer by the above-described aligner. In step S27 (development), the exposed wafer is developed. In step S28 (etching), portions other than the developed resist image are removed. In step S29 (resist separation), unnecessary resist after the etching process is removed. By repeating the foregoing steps, multiple circuit patterns are formed on the wafer. The manufacturing machine employed in each of the above steps is maintained by the aforementioned remote maintenance system. Therefore, trouble can be prevented before it occurs, and even if trouble occurs, quick recovery is possible. Accordingly, the productivity of a semiconductor device can be improved as compared to a conventional level.

OTHER EMBODIMENTS

The present invention can also be achieved by providing a software program which realizes functions of the above-described embodiments (stereoscopic shape measuring method or aligning method according to the present invention) directly or remotely to a computer system or an apparatus, and reading the program codes by a CPU or MPU of the computer system or apparatus, and then executing the program. Note that the form of the software is not limited to a program as long as it has the function of a program.

Therefore, program codes installed in the computer to realize the functions of the present invention also constitute the present invention. In other words, the present invention claims a computer program which realizes the functions of the present invention.

In this case, any form of a program, such as an object code, a program executed by an interpreter, or script data supplied to an OS, can be employed as long as it has the function of a program.

The storage medium, such as a floppy disk, a hard disk, an optical disk, a magneto-optical disk, an MO, a CD-ROM, a CD-R, a CD-RW, a magnetic tape, a nonvolatile type memory card, a ROM, a DVD (DVD-ROM, DVD-R), and so on, can be used for providing the program.

In addition, a program can be provided by accessing a homepage on the Internet with the use of a browser of a client computer, and downloading from the homepage the computer program of the present invention or a compressed file including an automatic installation function to a storage medium, such as a hard disk, or the like. Furthermore, program codes constructing the program of the present invention may be divided into a plurality of files, and each of the files may be downloaded from different homepages. In other words, the present invention claims a world wide web (WWW) server, which allows plural users to download the program file, which realizes functions of the present invention.

Furthermore, the program according to the present invention may be enciphered and stored in a storage medium, such as a CD-ROM, or the like, to be distributed to users. A user who satisfies a predetermined condition is allowed to download a deciphering key from a homepage through the Internet. With the use of the deciphering key, the enciphered program may be executed by installing it in a computer.

Furthermore, besides the aforesaid functions according to the above embodiments being realized by executing the program codes, which are read by a computer, the present invention also includes a case wherein an OS (operating system), or the like, working on the computer performs a part of or the entire processes in accordance with designations of the program codes and realizes functions of the above embodiments.

Furthermore, the present invention also includes a case where, after the program codes read from the storage medium are written in a function expansion card, which is inserted into the computer or in a memory provided in a function expansion unit, which is connected to the computer, a CPU, or the like, contained in the function expansion card or unit performs a part of or the entire process in accordance with designations of the program codes and realizes functions of the above embodiments.

The present invention is not limited to the above embodiments and various changes and modifications can be made within the spirit and scope of the present invention. Therefore, to apprise the public of the scope of the present invention, the following claims are made.

What is claimed is:

1. An aligning method of performing a relative alignment between a first object and a resist-coated second object when a pattern on the first object is transferred onto the second object, said method comprising:

a first measuring unit arranged to measure the shape of the surface of the second object without coming into contact with a surface of the second object;

a second measuring unit arranged to measure the shape of the surface of the second object while being allowed to contact the second object; and an operation controller arranged to control a measurement operation of said second measuring unit by using a measurement result of said first measuring unit, wherein when a shape of an alignment-mark-formed portion of the surface of the second object is measured, an alignment offset value of the alignment-mark-formed portion of the second object is obtained after resist coating the surface, and the alignment offset value is used for the relative alignment.

2. An exposure apparatus for performing relative alignment between a substrate and an original plate and exposing a pattern of the original plate onto the substrate, said apparatus comprising:

a first measuring unit arranged to measure a shape of a surface of the substrate without coming into contact with the surface of the substrate;

a second measuring unit arranged to measure the shape of the surface of the substrate while being allowed to contact the substrate;

an operation controller arranged to control a measurement operation of said second measuring unit by using a measurement result of said first measuring unit; and an aligning unit arranged to perform relative alignment between the substrate and the original plate based on the shape of the surface of the substrate.

3. A semiconductor device manufacturing method comprising the steps of:

installing manufacturing machines for performing various processes, including an exposure apparatus, in a semiconductor manufacturing factory; and manufacturing a semiconductor device in a plurality of processes by using the manufacturing machines, said exposure apparatus being provided for exposing a pattern of an original plate onto a substrate which is aligned with the original plate, said exposure apparatus comprising:

(i) a first measuring unit arranged to measure a shape of a surface of the substrate without coming into contact with the surface of the substrate;

(ii) a second measuring unit arranged to measure the shape of the surface of the substrate while being allowed to contact the substrate;

(iii) an operation controller arranged to control a measurement operation of the second measuring unit by using a measurement result of the first measuring unit; and (iv) an aligning unit arranged to perform relative alignment between the substrate and the original plate based on the shape of the surface of the substrate.

4. The semiconductor device manufacturing method according to claim 3, further comprising the steps of:

connecting the manufacturing machines through a local area network; and communicating information related to at least one of the manufacturing machines between the local area network and an external network outside the semiconductor manufacturing factory.

5. The semiconductor device manufacturing method according to claim 4, further comprising performing production management by obtaining maintenance information of the manufacturing machines through data communication, which is realized by accessing a database provided by a vendor of the exposure apparatus or a user through the external network, or by data communication between the semiconductor manufacturing factory and another semiconductor manufacturing factory through the external network.

6. A semiconductor manufacturing factory comprising:

manufacturing machines for performing various processes, including an exposure apparatus for exposing a pattern of an original plate onto a substrate which is aligned with the original plate, said exposure apparatus comprising:

(i) a first measuring unit arranged to measure a shape of a surface of the substrate without coming into contact with the surface of the substrate;

(ii) second measuring unit arranged to measure the shape of the surface of the substrate while being allowed to contact the substrate;

(iii) an operation controller arranged to control a measurement operation of the second measuring unit by using a measurement result of the first measuring unit; and (iv) an aligning unit arranged to perform relative alignment between the substrate and the original plate based on the shape of the surface of the substrate;

a local area network connecting each of said manufacturing machines; and a gateway enabling said local area network to access an external network outside the factory;

wherein said factory is capable of performing data communication regarding information related to at least one of the manufacturing machines.

7. A maintenance method of an exposure apparatus installed in a semiconductor manufacturing factory, the exposure apparatus exposing a pattern of an original plate onto a substrate which is aligned with the original plate, and including a first measuring unit arranged to measure a shape of a surface of the substrate without coming into contact with the surface of the substrate, a second measuring unit arranged to measure the shape of the surface of the substrate while being allowed to contact the substrate, an operation controller arranged to a control measurement operation of the second measuring unit by using a measurement result of the first measuring unit, and an aligning unit arranged to perform relative alignment between the substrate and the original plate based on the shape of the surface of the substrate, said method comprising the steps of:

providing, by a vendor of the exposure apparatus or a user, a maintenance database connected to an external network outside the semiconductor manufacturing factory;

permitting the semiconductor manufacturing factory an access to the maintenance database through the external network; and transmitting maintenance information stored in the maintenance database to the semiconductor manufacturing factory through the external network.

8. An exposure apparatus for exposing a pattern of an original plate onto a substrate which is aligned with the original plate, and including a first measuring unit arranged to measure a shape of a surface of the substrate without coming into contact with the surface of the substrate, a second measuring unit arranged to measure the shape of the surface of the substrate while being allowed to contact the substrate, an operation controller arranged to control a measurement operation of the second measuring unit by using a measurement result of the first measuring unit, and an aligning unit arranged to perform relative alignment between the substrate and the original plate based on the shape of the surface of the substrate, said exposure apparatus comprising:

a display;

a network interface; and a computer executing network software, wherein data communication regarding maintenance information of said exposure apparatus is enabled through a computer network.

9. The exposure apparatus according to claim 8, wherein the network software provides a user interface on the display for accessing a maintenance database, which is provided by a vendor of the exposure apparatus or a user and connected to an external network outside a factory where the exposure apparatus is installed, to enable data acquisition from the database through the external network.

10. A position detecting method for detecting a position of a mark formed on an object, in which the object is coated by a resist, said method comprising:

a detecting step for detecting light from the resist-coated object and producing a detection result; and a calculating step for calculating the position of the mark from the detection result and an offset value, wherein the offset value is determined from the surface shape of the object before the resist is coated and the surface shape of the resist after the resist is coated, wherein at least one of the surface shape of the object and the surface shape of the resist is measured by a surface measurement method comprising:

(i) a first measuring step for measuring the surface shape by detecting the light from the object or the resist; and (ii) a second measuring step for measuring the surface shape by relatively scanning a probe and the object, wherein a scanning speed changes on the basis of the result in the first measurement step.

* * * * *

UNITED STATES PATENT AND TRADEMARK OFFICE
CERTIFICATE OF CORRECTION

PATENT NO. : 6,950,179 B2
DATED : September 27, 2005
INVENTOR(S) : Hideki Ina et al.

It is certified that error appears in the above-identified patent and that said Letters Patent is hereby corrected as shown below:

Column 1,
Lines 41 and 42, "Tungsten" should read -- tungsten --.

Column 2,
Line 36, "Khz." should read -- kHz. --.

Column 3,
Line 51, "surface-film" should read -- surface film --.

Column 4,
Line 35, "surface-film" should read -- surface film --.

Column 6,
Line 66, "follows" should read -- follow --.

Column 13,
Line 22, "FIG. 18" should begin a new paragraph.

Signed and Sealed this

Twenty-first Day of March, 2006

JON W. DUDAS
*Director of the United States Patent and Trademark Office*